United States Patent
Truce et al.

(10) Patent No.: US 8,043,587 B2
(45) Date of Patent: Oct. 25, 2011

(54) REVERSE FLOW REACTOR

(75) Inventors: Rodney John Truce, Sherwood (AU);
Mieczyslaw Adam Gostomczyk,
Wroclaw (PL)

(73) Assignee: Indigo Technologies Group Pty Ltd,
Queensland (AU)

( * ) Notice: Subject to any disclaimer, the term of this patent is extended or adjusted under 35 U.S.C. 154(b) by 0 days.

(21) Appl. No.: 12/668,343

(22) PCT Filed: Jul. 11, 2008

(86) PCT No.: PCT/AU2008/001023
§ 371 (c)(1),
(2), (4) Date: Mar. 3, 2010

(87) PCT Pub. No.: WO2009/006703
PCT Pub. Date: Jan. 15, 2009

(65) Prior Publication Data
US 2010/0202948 A1    Aug. 12, 2010

(30) Foreign Application Priority Data
Jul. 12, 2007   (AU) ................ 2007903784

(51) Int. Cl.
*B01D 53/34*  (2006.01)
*B01D 53/74*  (2006.01)
*F24F 3/14*   (2006.01)
*F24F 3/16*   (2006.01)

(52) U.S. Cl. .......... 423/210; 423/DIG. 6; 422/168; 422/207; 165/60; 165/95; 165/900

(58) Field of Classification Search ........... 423/210, 423/DIG. 6; 422/168, 207; 165/60, 95, 900
See application file for complete search history.

(56) References Cited

U.S. PATENT DOCUMENTS

| | | | | | |
|---|---|---|---|---|---|
| 1,919,781 | A | * | 7/1933 | Forrest et al. | 95/191 |
| 2,907,554 | A | * | 10/1959 | Heller | 165/125 |
| 3,299,619 | A | * | 1/1967 | Terry | 210/788 |
| 3,985,510 | A | | 10/1976 | Taylor | |
| 4,031,173 | A | * | 6/1977 | Rogers | 261/24 |
| 2003/0082085 | A1 | * | 5/2003 | Harada et al. | 423/210 |

FOREIGN PATENT DOCUMENTS

| | | | |
|---|---|---|---|
| EP | 1 923 119 A1 | | 5/2008 |
| JP | 55-121318 A | | 9/1980 |
| JP | 61-011125 A | | 1/1986 |
| JP | 2-230008 A | * | 9/1990 |
| JP | 6-201293 A | * | 7/1994 |
| JP | 6-257965 A | * | 9/1994 |

(Continued)

*Primary Examiner* — Timothy Vanoy
(74) *Attorney, Agent, or Firm* — The Web Law Firm

(57) ABSTRACT

A reactor cools humidifies gases produced by combustion or the like. The reactor has a chamber with an inlet at a lower end to receive a flow of gas, and an outlet at a upper end. The gas flows in a generally upward direction through the reactor. The horizontal cross-section of the chamber increases with height and the flow velocity of the gas decreases as it flows upwardly. The reactor includes at least one device for injecting water droplets into the upper region of the chamber, counter to the gas flow. As the water droplets fall, they gradually evaporate and lose mass and encounter a counterflow of increasingly higher velocity and temperature until the force of the upwardly flowing gas is sufficient to reverse their flow and carry them in an upward direction.

7 Claims, 8 Drawing Sheets

FOREIGN PATENT DOCUMENTS

| | | | |
|---|---|---|---|
| JP | 6-265281 A | * | 9/1994 |
| JP | 7-232031 A | | 9/1995 |
| WO | 9842432 A1 | | 10/1998 |
| WO | 0134854 A2 | | 5/2001 |
| WO | 2004096420 A1 | | 11/2004 |
| WO | 2005075837 A1 | | 8/2005 |

* cited by examiner

REVERSE FLOW REACTOR

FIELD OF THE INVENTION

This invention relates generally to pollution control. In particular, the invention is directed to a reverse flow reactor which is used to cool and/or humidify gases produced by combustion or other industrial process, to enhance oxidation and removal by absorption of gaseous pollutants such as nitrogen oxides (NOx), sulphur oxides (SOx), volatile organic compounds (VOCs) and mercury (Hg).

BACKGROUND ART

[Mere Reference to Background Art Herein Should Not Be Construed as an Admission that Such Art Constitutes Common General Knowledge in Relation to the Invention.]

Various methods and apparatus have been used to remove dust, ash, and other pollutant particles from air streams, including electrostatic precipitators and fabrics filters.

Moreover, it is known to use particle agglomerators to cause smaller particles to agglomerate into larger sized particles which can then be removed from the gas stream more easily.

Upward flow reactors have also been used to assist in removal of dust and other pollutants. In such reactors, waste gas is fed into the bottom of an upright chamber, and flows upwardly through the chamber. Water sprays are located at the bottom, and sometimes in the middle, of the chamber and spray water droplets upwardly with the gas flow. These droplets flow with the gas in an upward direction, and increase the moisture content (humidity) of the gas to assist in hydration of the alkaline oxides and absorption of gaseous pollutants.

It is an aim of this invention to provide a more efficient reactor.

SUMMARY OF THE INVENTION

In one broad form, this invention provides a reactor of the type comprising a chamber having an inlet at a lower end thereof adapted to receive a flow of gas, and an outlet at a upper end thereof, the chamber being configured to define a generally upward flow path for the gas flow therein.

In the reactor of this invention:
at least one water spray is used to inject water droplets into the upper region of the chamber, preferably adjacent to the top of the chamber, counter to the gas flow (and for this reason, the reactor is hereinafter referred to as a "reverse flow" reactor); and/or
the horizontal cross-section of the chamber increases with height such that the flow velocity of the gas decreases as it flows upwardly in the chamber.

In another broad form, the invention provides a method of cooling and/or humidifying gases produced by combustion or other industrial process, using such a reactor. The method comprises the steps of:
causing the gas to flow generally upwardly through the chamber from the inlet to the outlet, and
injecting water droplets into the chamber in the upper region thereof, counter to the gas flow.

In use, the water droplets from the sprays initially fall under gravity or initial spray velocity until the force of the upwardly flowing gas is sufficient to reverse their flow and carry them in an upward direction. As the water droplets flow downwards, they gradually evaporate and their mass reduces, thereby reducing the gravitational force acting upon them. Moreover, the water droplets will encounter a counter or opposing gas flow of increasingly higher velocity as they fall. The gas temperature is also higher at the bottom of the chamber. Thus, as the water droplets descend through the chamber, the evaporation rate will increase due to increasing gas temperature and gas velocity. Once the droplet flow reverses, they will continue to evaporate while moving in an upward direction until complete evaporation occurs at the top of the chamber where the velocity is lowest.

In this manner, the gas temperature is reduced, and the moisture content of the gas is increased, as the gas flows from the bottom of the chamber to the top. The efficiency of oxidation and removal processes increases with increasing moisture content and reducing temperature of the gas being treated. The reverse flow reactor provides these conditions by using reverse flow water sprays to efficiently cool the gas and increase the moisture content (humidity).

The reverse flow reactor of this invention may optionally be used in conjunction with an agglomerator installed at the outlet of the reactor to provide micro-mixing and thereby improve or enhance the absorption process.

If desired or required, additional absorbent may be injected into the upper portion of the chamber, preferably adjacent to the top of the chamber, or at the outlet of the chamber, to increase the absorption of pollutants.

One or more organic acids may be injected adjacent the bottom of the chamber or in an inlet to the chamber to increase the efficiency by which alkaline oxides from ash are activated in the reverse flow reactor, thereby improving the absorption process.

An oxidizing reagent may be injected adjacent to the bottom of the chamber, in the inlet to the chamber, or at a point in the reactor where the temperature of the flue gas is most conducive for oxidation reactions, to oxidize NO, Hg and VOCs so as to allow removal by an absorbent.

Sonic horns may be installed in the reverse flow reactor to improve cleaning of the internal walls of the chamber.

To accommodate variable or reduced gas flows, the reverse flow reactor may include staged sprays with different droplet sizes. The droplet size is reduced when gas flow is reduced.

The term 'water' is not to be regarded as limiting and is intended to also include water solutions such as, for example, waste water, sea water, and water with an oxidiser, or other additive.

In order that the invention may be more readily understood and put into practice, one or more embodiments thereof will now be described, by way of example only, with reference to the accompanying drawings.

DESCRIPTION OF EMBODIMENTS OF THE INVENTION

Figure 1:
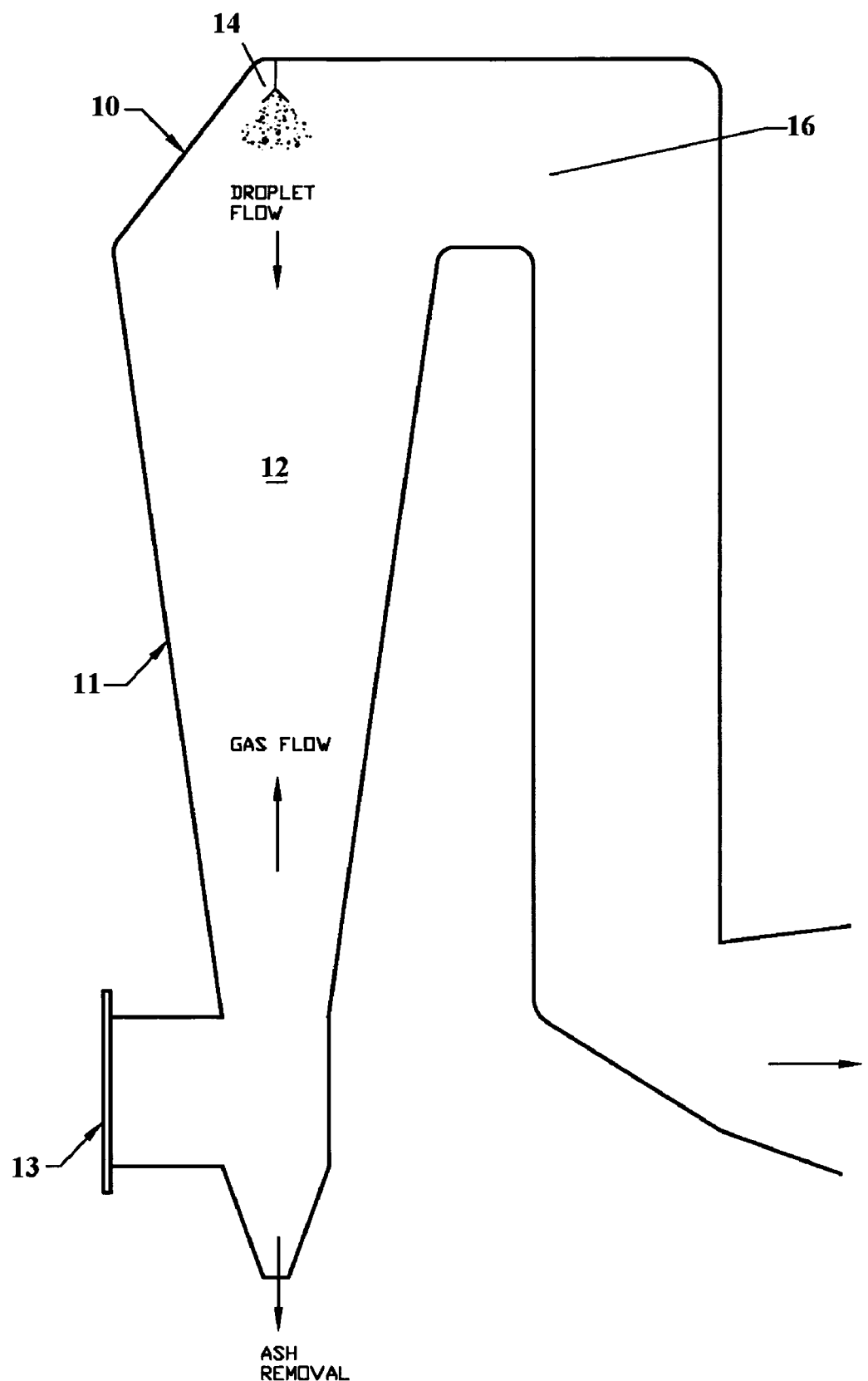
FIG. 1 is a schematic sectional elevation of a reverse flow reactor according to one embodiment of the invention.

As shown in FIG. 1, a reverse flow reactor 10 comprises a generally upright duct 11 which defines a reaction chamber 12 of rectangular cross-section. However, the chamber cross-section may be round or square, or any other suitable shape. The cross-sectional area of the reaction chamber 12 increases from the bottom to the top, preferably by a factor of between 2 and 10. The increase in cross-sectional area need not be linear or uniform.

Gas from an industrial process is fed to a gas inlet 13 at the bottom of the duct 11, and flows upwardly in the reaction chamber 12 with reducing velocity as the chamber cross-sectional area increases, to an outlet 16. The gas velocity at the bottom of the chamber 12 is typically in the range of 8 m/s to 32 m/s, while the velocity at the top of the chamber is typically in the range of 2 m/s to 8 m/s, for a increase in chamber cross-sectional area of 4.

Spray devices 14 are located adjacent the top of the reaction chamber 12 to spray cooling water in a downward direction. The sprays 14 can be nozzles having multiple apertures, and are preferably mounted on the roof of the reactor, as shown in FIG. 1, or on a spray lance (not shown) in the top or upper region of the reactor.

In use, the water droplets from sprays 14 flow in a downward direction, due to gravity or initial velocity, until the viscous force due to the upwardly flowing gas is sufficient to reverse their flow and carry them in an upward direction.

More specifically, as the water droplets flow downwards, they evaporate and their mass will reduce, thereby reducing the gravitational force acting on them. As the droplet size reduces, the downward gravitational force reduces in proportion to the volume (which is proportional to the cube of the diameter), while the upward viscous force reduces in proportion to the surface area (which is proportional to the square of the diameter). Hence, the ratio of the downward gravitational force to the upward viscous force will reduce in proportion to the reducing droplet diameter.

The gas temperature is higher at the bottom of the chamber 12 (generally about 140 deg C.), compared to the gas temperature at the top of the chamber 12 (generally about 70 deg C.). Moreover, the water droplets will encounter a counter gas flow of increasingly higher velocity as they fall. Thus, as the water droplets descend through the chamber 12, the evaporation rate will increase due to increasing gas temperature and gas velocity. Once the droplet flow reverses, they will continue to evaporate while moving in an upward direction until complete evaporation occurs at the top of the chamber 12 where the velocity is lowest.

In this manner, the gas temperature is reduced from about 140 deg C. at the bottom of the chamber 12 to about 65 deg C. at the top of the chamber 12. The moisture content of the gas flow will increase from about 7% at the bottom of the chamber 12 to about 15% at the top of the chamber 12. These conditions enable alkaline hydroxides and other material, contained in the dust suspended in the gas, to absorb the gaseous pollutants such as SOx, NOx, Hg and VOCs.

The arrangement of the inlet ducts, and the shape and size of the reactor, will change from site to site. The size of the reactor will depend on the volume of gas being treated and the temperature drop required. The spray flow is controlled to maintain the outlet temperature at the desired value, and feed forward from gas flow is used to adjust spray flow as gas flow changes. The large droplet sprays will be reduced first when staged sprays are being used to allow increased gas flow variation.

By reducing the gas temperature and increasing the moisture content (humidity) of the gas, the reverse flow reactor enables two processes to occur efficiently, namely:— a) The hydration of the alkaline oxides to hydrates is increased, for example

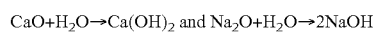

Hydrates are far more reactive absorbents than oxides, so this process increases the efficiency of pollutant removal by the absorption process.

b) The absorption process efficiency also increases at low temperatures, which increases the removal of gaseous pollutants such as $SO_3$, $SO_2$, $NO_2$ and other nitrogen oxides other than NO plus oxidized mercury.

Other advantages of the reverse flow reactor 10 include:
Increased Evaporation.
Due to the initial downward flow of the water droplets from the top to the bottom of the chamber 12, followed by an upward flow from the bottom to the top of the chamber 12, the droplets spend longer in the chamber 12 and hence there is greater evaporation, compared to normal upward flow reactors in which the water sprays are at the bottom and droplet flow is only in an upward direction.
Less Maintenance
Placing the water sprays at the top of the chamber 12 where the gas velocity is lower, reduces both erosion and dust build-up on the sprays.
Lower Droplet Carry Out
The low gas velocity at the top of the chamber 12 reduces the potential for droplet carry out from the chamber 12 compared to normal upward flow reactors that operate at higher exit velocities.
Fewer Obstructions
As the water sprays are located at the top on the chamber 12, compared to the bottom on normal upward flow reactors, there is no obstruction above the ash hoppers that can cause problems when large lumps of agglomerated ash fall from the walls of the reactor.
Larger Droplets/Fewer Nozzles
The size of the droplets is determined by the gas carrying capacity, dependent on the velocity and density, at the bottom of the reactor. Since the droplets evaporate on the way down in the chamber 12, the initial droplet size can be much larger than that in normal upward flow reactors which have the sprays at the bottom. The droplet size increases with nozzle capacity, so fewer nozzles each with a larger capacity can be used in the reverse flow reactor, thereby reducing cost.

Figure 2:
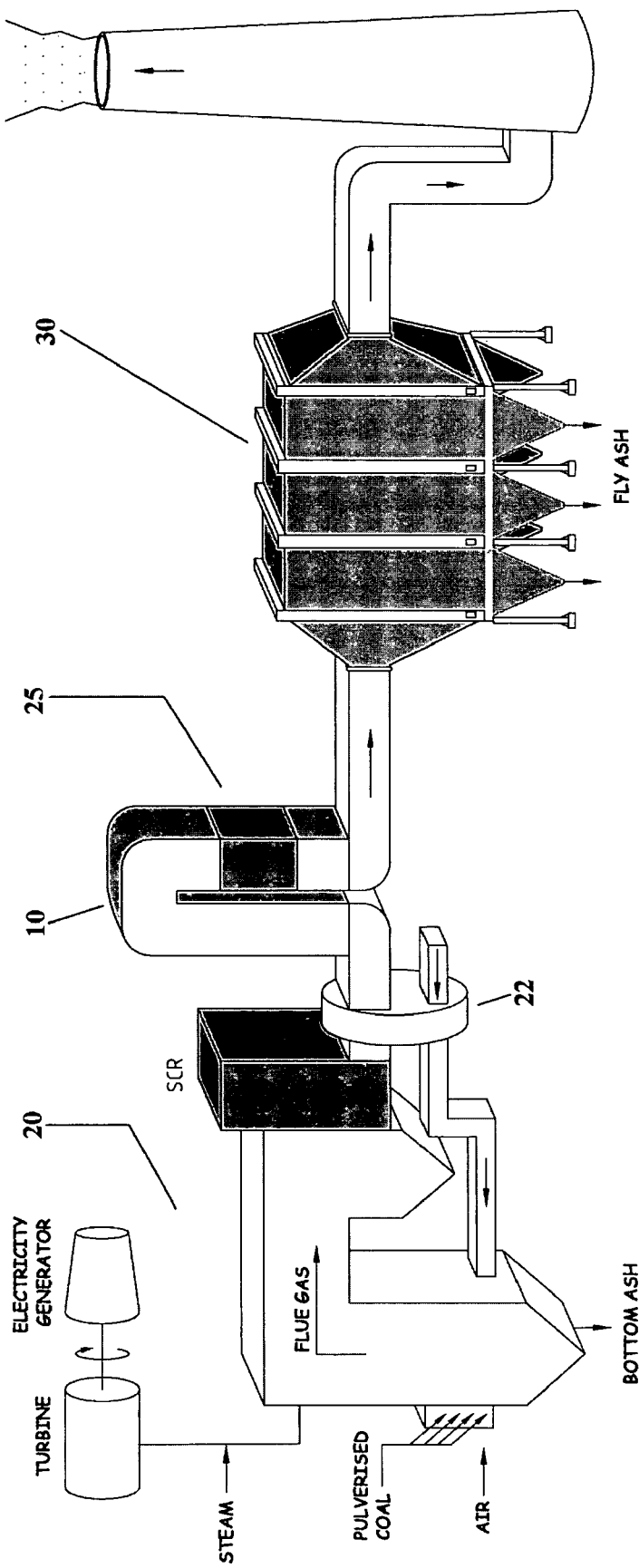
FIG. 2 is a schematic diagram of the reverse flow reactor of FIG. 1 installed between a source of industrial waste gases and an agglomerator.

As shown in FIG. 2, the reverse flow reactor 10 would normally be installed at the gas outlet of an industrial installation such as a coal fired power station 20, and before a particulate collection device 30, such as an electrostatic precipitator or fabric filter, so that any particulates generated in the reactor can be collected in the existing particulate collection device. As the reactor 10 reduces the gas temperature and increases the gas moisture content (humidity), it will enhance the dust collection efficiency of an electrostatic precipitator following the reactor, which will also result in a significant reduction in the particulate emission to the atmosphere. Most power stations use electrostatic precipitators to remove dust from the gas flow, and the reverse flow reactor 10 can be installed between an air-heater 22 and the electrostatic precipitator 30 as shown in FIG. 2.

An agglomerator 25 may optionally be installed at the outlet of the reactor 10 to provide micro-mixing and thereby improve or enhance the absorption process.

In an alternative arrangement, the reactor 10 can be installed after the particulate collection device 30 to treat the gas prior to emission to the atmosphere.

Additional processes that may be used to enhance the operation of the reverse flow reactor 10 to improve the pollutant removal include:

1. Injection of additional absorbent at the top or outlet of the reverse flow reactor to increase the absorption of pollutants.
2. Injection of an organic acid at the bottom or the inlet to the reverse flow reactor, or at a point in the reactor where the temperature of the flue gas is most conducive for oxidation reactions, to increase the efficiency by which alkaline oxides are activated in the reverse flow reactor, thereby improving the absorption process.
3. Injection of an oxidizing reagent at the bottom or the inlet to the reverse flow reactor, or at a point in the reactor where the temperature of the flue gas is most conducive for oxidation reactions, to oxidize NO, Hg and VOCs so as to allow removal by an absorbent.
4. Installation of sonic horns in the reverse flow reactor to improve cleaning of the internal walls.
5. Installation of staged sprays to reduce droplet size when gas flow reduces.

These will be described in more detail with reference to FIGS. 3 to 8.

The addition of organic acids such as acetic or formic acid will enhance the activation of alkaline oxides to alkaline hydrates by increasing the hydration rate or create a water soluble organic salts which react with stronger acids in the reactor. The organic acids can be added at the chamber inlet 13 in solid or liquid form, but may also be added in solution with the spray water from the spray nozzles 14.

Figure 3:
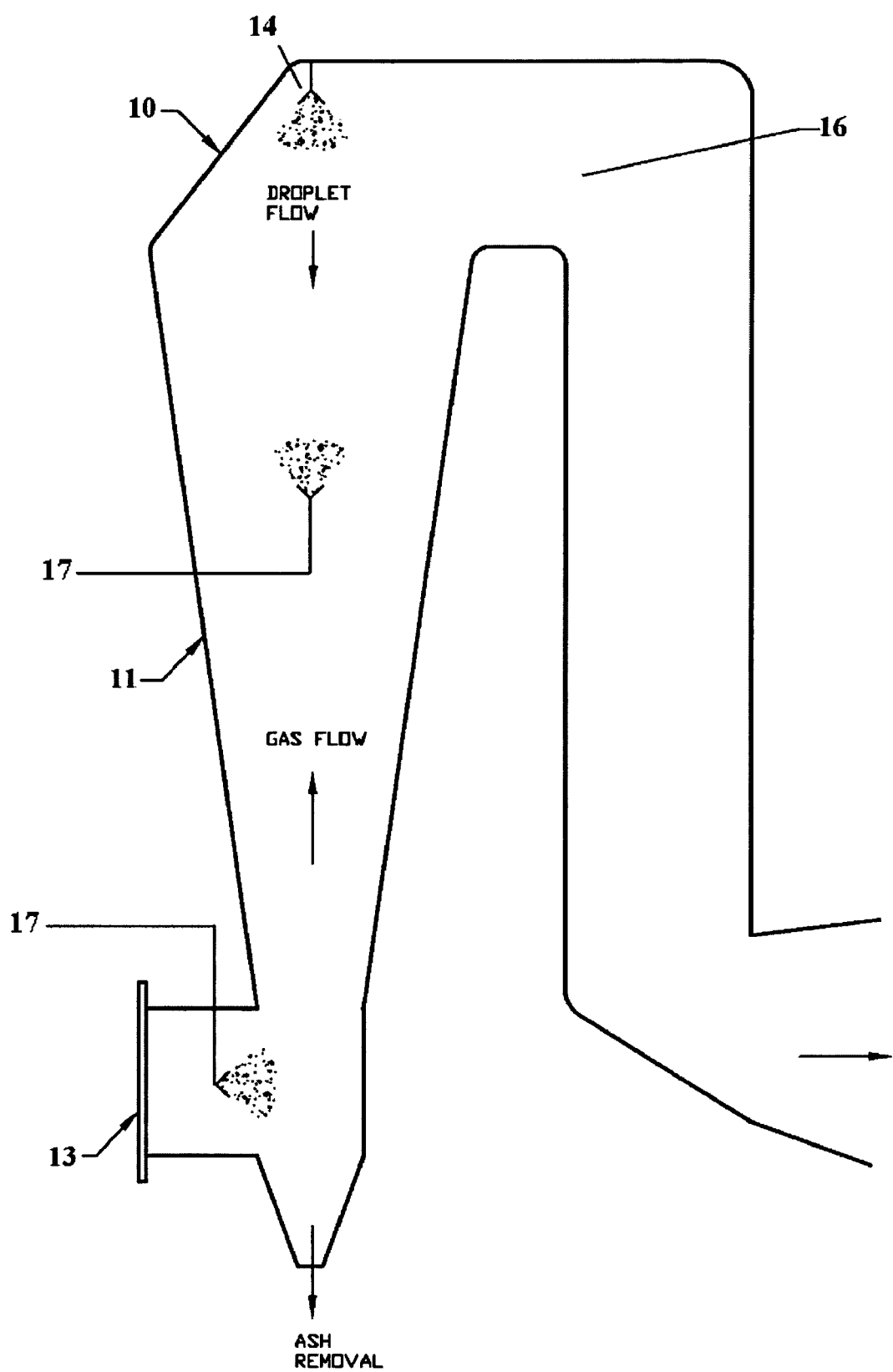
FIGS. 3 to 8 are schematic sectional elevations of reverse flow reactors according to additional embodiments of the invention.

As shown in FIG. 3, additional sprays 17 may be installed before the chamber inlet in the inlet duct leading to the reactor chamber 12, or in the reactor chamber 12 to allow the injection of the organic acids in liquid or solution form. To inject the organic acids salts in solid form they are first ground into a fine powder, generally less than 50 um in diameter, and air conveyed to a multi-port distribution lance in the inlet duct or in the chamber 12. The activator flow is controlled to maintain the outlet pollutant ($SO_2$) level at the desired value, and feed forward from gas flow is used to adjust activator flow as gas flow changes.

Figure 4:
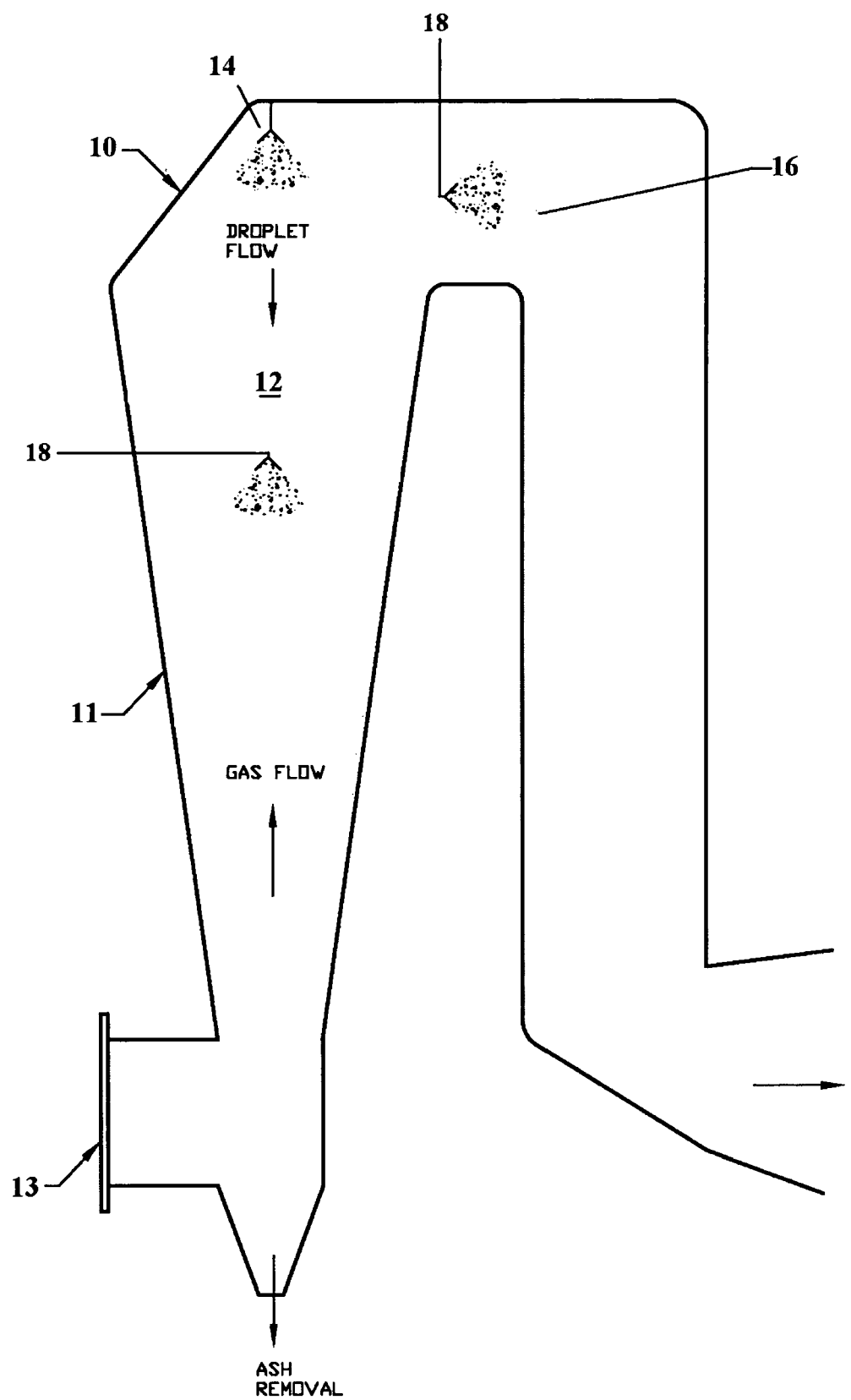

If there is insufficient absorbent suspended in the gas flow to achieve the required pollutant removal, additional sprays 18 may be installed in the outlet duct or in the upper part of the reactor to allow the injection of the absorbents in liquid or solution form, as shown in FIG. 4. The sprays 18 inject additional absorbent in the reactor chamber 12 in solution with the spray water, or in the outlet duct 16 where the gas temperature is lowest and the moisture content (humidity) of the gas is highest and hence the pollutant absorption rate will be highest.

Alkaline hydrates such as calcium hydrate ($Ca(OH)_2$) or sodium hydrate (NaOH) are normally injected in solid or liquid form to increase the gaseous pollutant removal. Again, to inject the absorbents in solid form, they are first ground into a fine powder, generally less than 50 um in diameter, and air conveyed to a multi-port distribution lance in the outlet duct or in the top of the reactor. The absorbent is controlled to maintain the outlet pollutant ($SO_2$) level at the desired value, and feed forward from gas flow is used to adjust absorbent flow as gas flow changes.

Figure 5:
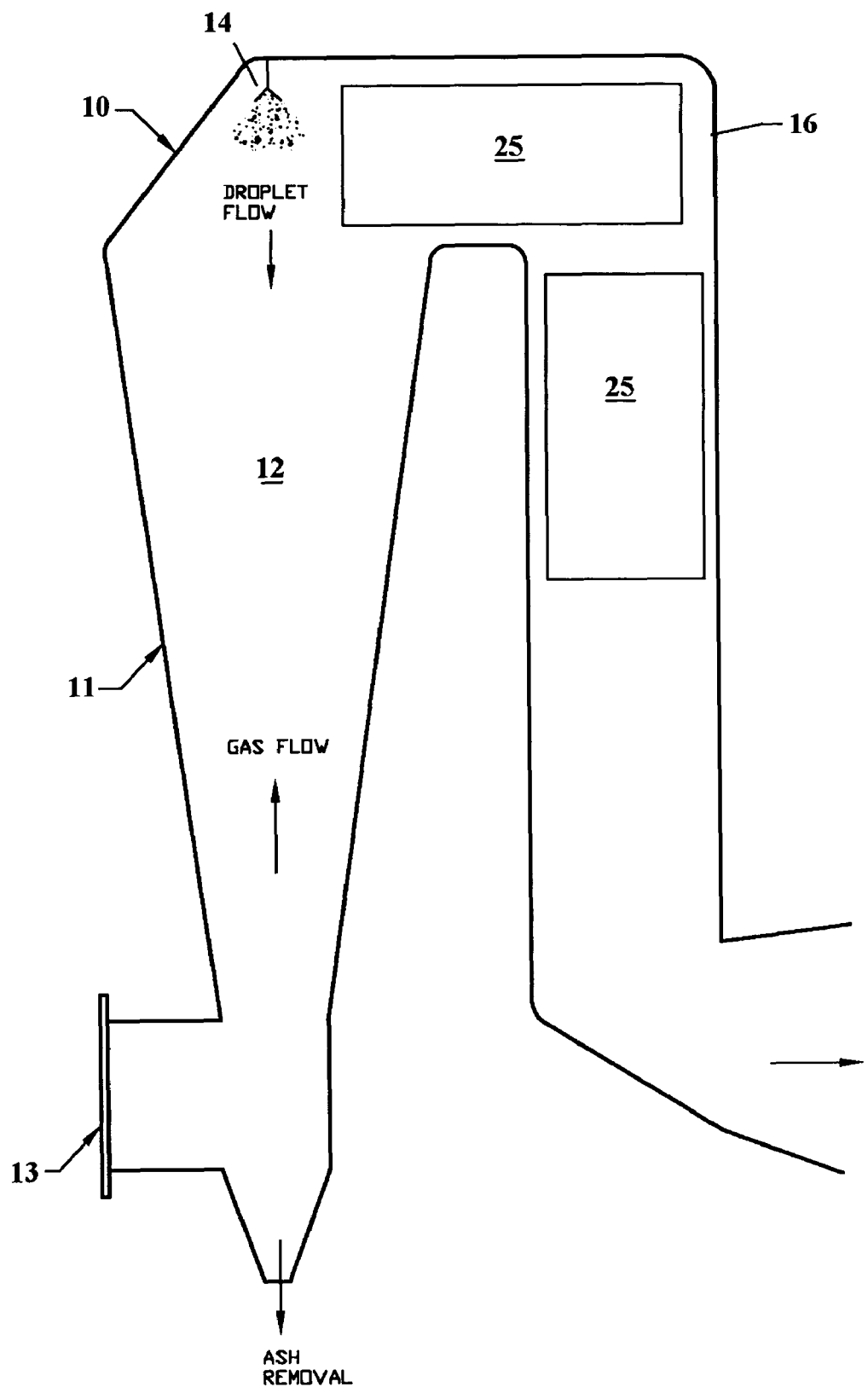

An agglomerator generates micro-mixing using small vortices, as described in international patent applications nos. PCT/NZ00/00223, PCT/AU2005/000160 and PCT/AU2004/000546. This micro-mixing increases the interaction between the absorbent and the pollutant gases being removed, thereby increasing the removal efficiency and increasing the absorbent utilization. As shown in FIG. 5, an agglomerator 25 can be located in the reactor outlet duct 16 where the removal process is most effective due to the reduced gas temperature and increased moisture content.

Some pollutants, such as NO and elemental Hg, are not removed effectively by absorbents and must be oxidized, for example NO to NO2 and elemental Hg to oxidized Hg, to allow efficient removal in the reactor. This can be achieved by adding an oxidizing agent, such as $O_3$, $H_2O_2$, NaClO, $Ca(ClO)_2$, or $ClO_2$ at the inlet 13 to the reactor 10.

Figure 6:
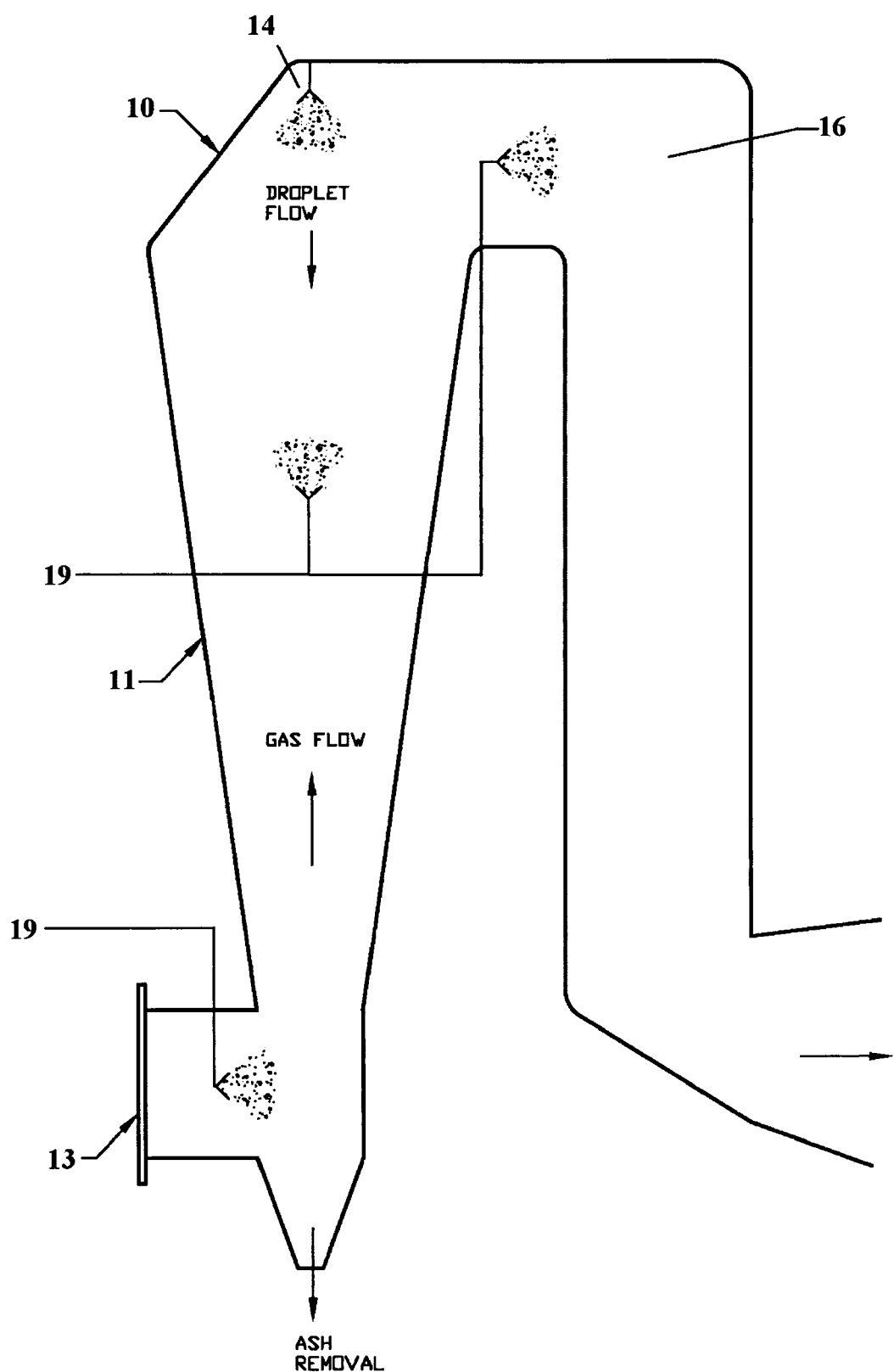

As shown in FIG. 6, additional sprays 19 may be installed in the inlet duct leading to the reactor, in the bottom of the reactor or in the low temperature region of the reactor, to allow the injection of the oxidizing agents in gaseous form ($O_3$), solid form ($Ca(ClO)_2$) or liquid form ($H_2O_2$). However, the oxidising agent may also be added in solution with the spray water.

To inject the oxidizing agents in solid form, they are first ground into a fine powder, generally less than 50 um in diameter, and air conveyed to a multi-port distribution lance 19 in the inlet duct or in the bottom of the reactor. The oxidizer flow will be controlled to maintain the outlet pollutant (NO) level at the desired value, and feed forward from gas flow will be used to oxidizer flow as gas flow changes.

Figure 7:
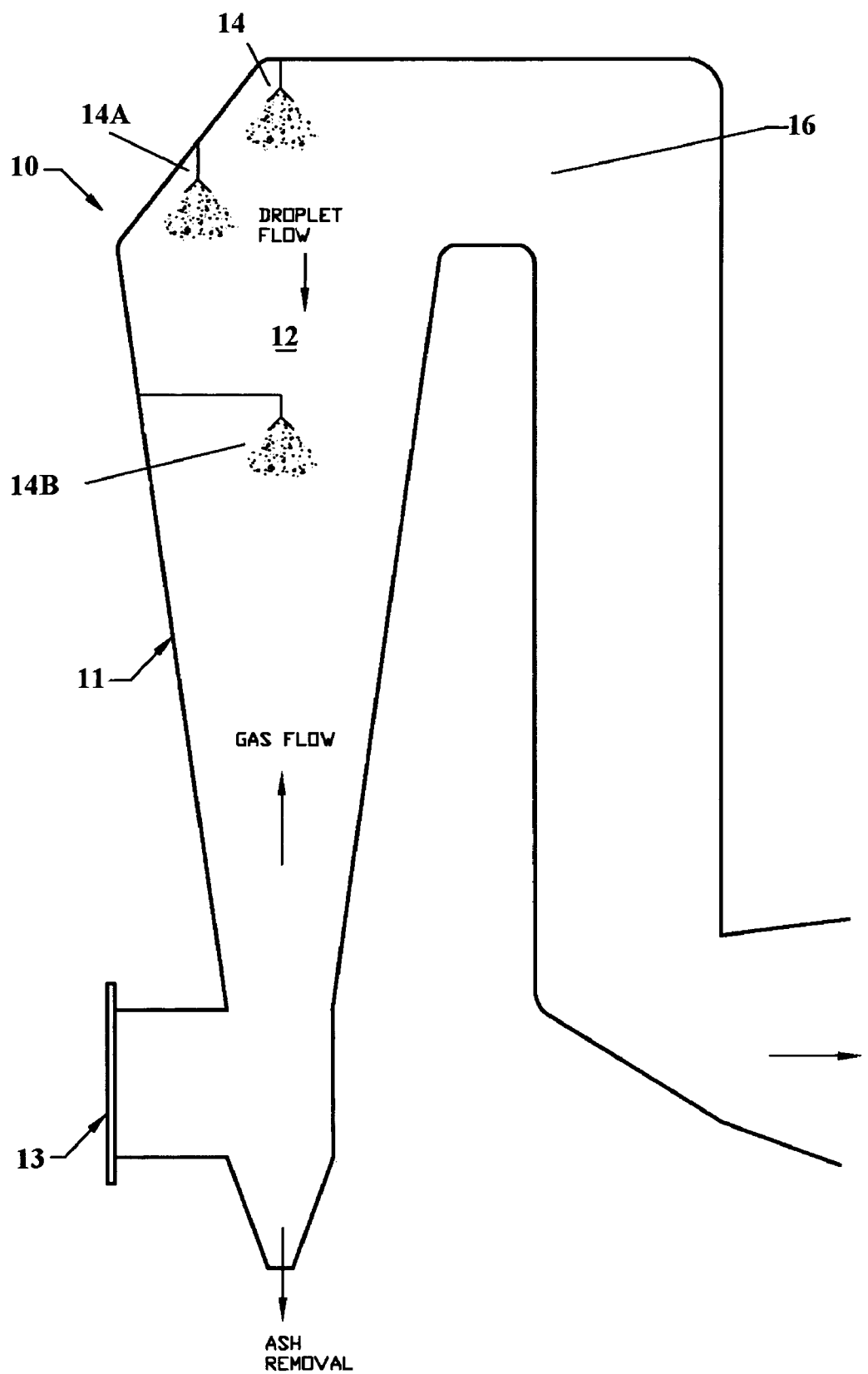

In many applications, such as power station boilers, the gas flow will vary greatly, by up to 60%. As the flow is reduced, the spray droplet size will also need to be reduced to prevent the droplets falling into the hopper, due to reduced evaporation and reduced upward force resulting from the reduced gas velocity. As shown in FIG. 7, this may be accommodated by using multiple sprays 14, 14A, 14B with different droplet sizes. The larger the spray droplet size, the larger the nozzle capacity, so fewer nozzles are required.

If large changes in gas flow are expected, then two or three different nozzles producing different droplet sizes may be used. As the gas flow reduces, the spray flow in the largest droplet nozzles is reduced first. For example 50% of the spray flow may be delivered by the large droplet nozzles (located in the centre of the reactor), 30% by medium size droplet nozzles (located at the sides of the reactor) and the final 20% by small droplet nozzles (located at the bottom of the reactor to allow the addition of an oxidizer or an activator). As the gas volume is reduced, the large droplet nozzle flow would be reduced until at 50% gas flow only the medium and the small droplet nozzles would be operating, and at 20% gas flow only the small droplet nozzles would be operating.

If large changes in gas flow are expected, then two or three different nozzles producing different droplet sizes may be used. Alternatively a nozzle that allows variations in solution and air flow to produce larger or smaller droplet sizes may be used.

Figure 8:
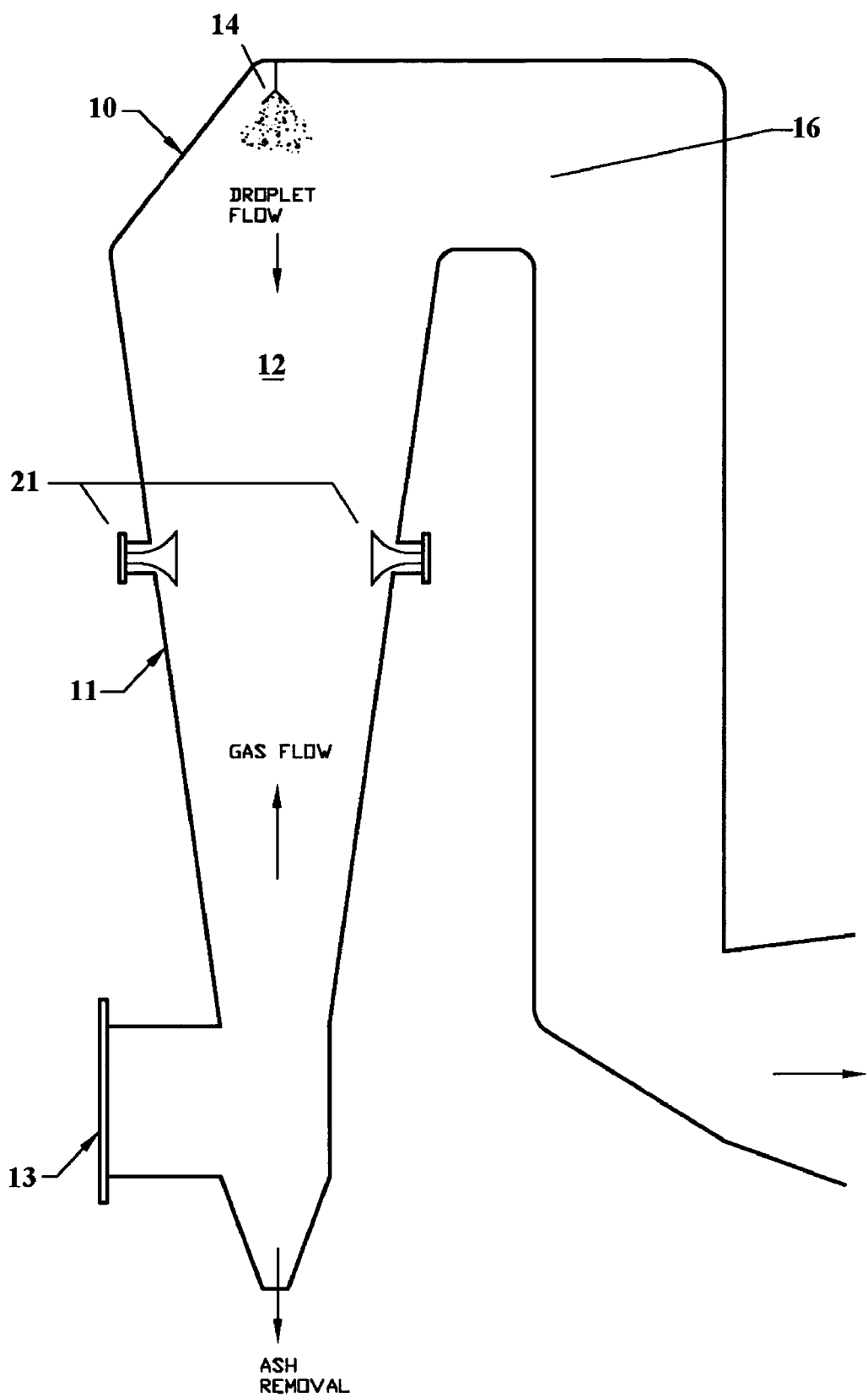

Build-up may occur on the internal walls of the chamber 12 depending on the nature of the dust suspended in the gas and the spray requirements. In order to minimise this build-up, sonic horns 21 can be installed in the reactor chamber as shown in FIG. 8. These horns would be operated periodically, say for 10 seconds every 20 minutes, to help remove any build-up before it became excessive.

It is to be understood that the terminology employed above is for the purpose of description and should not be regarded as limiting. The described embodiments are intended to be illustrative of the invention, without limiting the scope thereof.

Accordingly, it is to be understood that the scope of the invention is not to be limited to the exact construction and operation described and illustrated, but only by the following claims which are intended, where the applicable law permits, to include all suitable modifications and equivalents within the spirit and concept of the invention.

Throughout this specification, including the claims, where the context permits, the term "comprise" and variants thereof such as "comprises" or "comprising" are to be interpreted as including the stated integer or integers without necessarily excluding any other integers.

The invention claimed is:

1. A reactor for cooling and/or humidifying gases produced by combustion or other industrial process, the reactor comprising:
   a chamber having an inlet at a lower end thereof adapted to receive a flow of gas, and an outlet at an upper end thereof, wherein the chamber is configured to define a generally upward flow path for the gas flow therein, and wherein the horizontal cross-section of the chamber increases with height such that the flow velocity of the gas decreases as it flows upwardly in the chamber; and
   at least one sonic horn cleaning an internal wall of the chamber.

2. A reactor for cooling and/or humidifying gases produced by combustion or other industrial process, the reactor comprising:
   a chamber having an inlet at a lower end thereof adapted to receive a flow of gas, and an outlet at an upper end thereof, wherein the chamber is configured to define a generally upward flow path for the gas flow therein, and wherein the horizontal cross-section of the chamber increases with height such that the flow velocity of the gas decreases as it flows upwardly in the chamber; and
   a plurality of spray devices for injecting water droplets of different sizes into the chamber.

3. A method of cooling and/or humidifying gases produced by combustion or other industrial process, using a reactor comprising a chamber having an inlet at a lower end thereof adapted to receive a flow of gas, and an outlet at an upper end thereof, the method comprising the steps of:
   causing the gas to flow generally upwardly through the chamber from the inlet to the outlet;
   injecting water droplets into the chamber in the upper region thereof, counter to the gas flow; and
   injecting absorbent material in an upper region of the chamber or at outlet of the chamber, to increase the absorption of pollutants.

4. A method of cooling and/or humidifying gases produced by combustion or other industrial process using a reactor comprising a chamber having an inlet at a lower end thereof adapted to receive a flow of gas, and an outlet at an upper end thereof, the method comprising the steps of:
   causing the gas to flow generally upwardly through the chamber from the inlet to the outlet;
   injecting water droplets into the chamber in the upper region thereof, counter to the gas flow; and
   injecting one or more organic acids adjacent the bottom of the chamber or in an inlet to the chamber, to improve absorption by increasing the efficiency of activation of which alkaline oxides in the reactor.

5. The method as claimed in claim 4, wherein the step of injecting is located at a point in the reactor where the temperature of the flue gas is most conducive for oxidation reactions.

6. A method of cooling and/or humidifying gases produced by combustion or other industrial process using a reactor comprising a chamber having an inlet at a lower end thereof adapted to receive a flow of gas, and an outlet at an upper end thereof, the method comprising the steps of:
   causing the gas to flow generally upwardly through the chamber from the inlet to the outlet;
   injecting water droplets into the chamber in the upper region thereof, counter to the gas flow; and
   injecting an oxidizing reagent adjacent the bottom of the chamber or in an inlet to the chamber, to oxidize pollutants so as to facilitate their removal by an absorbent.

7. A method of cooling and/or humidifying gases produced by combustion or other industrial process using a reactor comprising a chamber having an inlet at a lower end thereof adapted to receive a flow of gas, and an outlet at an upper end thereof, the method comprising the steps of:
   causing the gas to flow generally upwardly through the chamber from the inlet to the outlet;
   injecting water droplets into the chamber in the upper region thereof, counter to the gas flow; and
   using at least one sonic horn in cleaning an internal wall of the chamber.

* * * * *